(12) United States Patent
Willig et al.

(10) Patent No.: US 6,691,571 B2
(45) Date of Patent: Feb. 17, 2004

(54) ROTATIONAL SPEED SENSOR

(75) Inventors: Rainer Willig, Tamm (DE); Andreas Thomae, Tuebingen (DE); Burkhard Kuhlmann, Hameln (DE); Joerg Hauer, Reutlingen (DE); Udo-Martin Gomez, Leonberg (DE); Siegbert Goetz, Gerlingen (DE); Christian Doering, Stuttgart (DE); Michael Fehrenbach, Mittelstadt (DE); Wolfram Bauer, Tuebingen (DE); Udo Bischof, Wannweil (DE); Reinhard Neul, Stuttgart (DE); Karsten Funk, Palo Alto, CA (US); Markus Lutz, Palo Alto, CA (US); Gerhard Wucher, Reutlingen (DE); Jochen Franz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,218
(22) PCT Filed: Dec. 21, 2001
(86) PCT No.: PCT/DE01/04858
§ 371 (c)(1),
(2), (4) Date: May 29, 2003
(87) PCT Pub. No.: WO02/066927
PCT Pub. Date: Aug. 29, 2002

(65) Prior Publication Data
US 2003/0183007 A1 Oct. 2, 2003

(30) Foreign Application Priority Data
Feb. 21, 2001 (DE) .......................... 101 08 198

(51) Int. Cl.⁷ ............................................... G01C 19/00
(52) U.S. Cl. ............................... 73/504.12; 73/514.29; 73/514.32
(58) Field of Search ....................... 73/504.12, 504.13, 73/504.14, 514.29, 514.32, 514.38

(56) References Cited

U.S. PATENT DOCUMENTS

| 5,396,797 A | 3/1995 | Hulsing |
| 5,604,312 A | 2/1997 | Lutz |
| 5,635,638 A | 6/1997 | Geen |
| 5,728,936 A | 3/1998 | Lutz |
| 6,067,858 A | 5/2000 | Clark et al. |

FOREIGN PATENT DOCUMENTS

| DE | 44 14 237 | 10/1995 |
| DE | 44 28 405 | 2/1996 |
| DE | 44 42 033 | 5/1996 |
| DE | 195 19 488 | 11/1996 |
| DE | 195 30 007 | 2/1997 |
| DE | 196 41 284 | 5/1998 |
| DE | 100 35 605 | 1/2001 |
| EP | 0 911 606 | 4/1999 |
| WO | WO 98 15799 | 4/1998 |

*Primary Examiner*—Richard A. Moller
(74) *Attorney, Agent, or Firm*—Kenyon & Kenyon

(57) ABSTRACT

An rate-of-rotation sensor having a Coriolis element, which is arranged over a surface of a substrate, is described. The Coriolis element is induced to oscillate in parallel to a first axis. In response to a Coriolis force, the Coriolis element is deflected in a second axis, which is perpendicular to the first axis. A proof element is provided to prove the deflection.

9 Claims, 3 Drawing Sheets

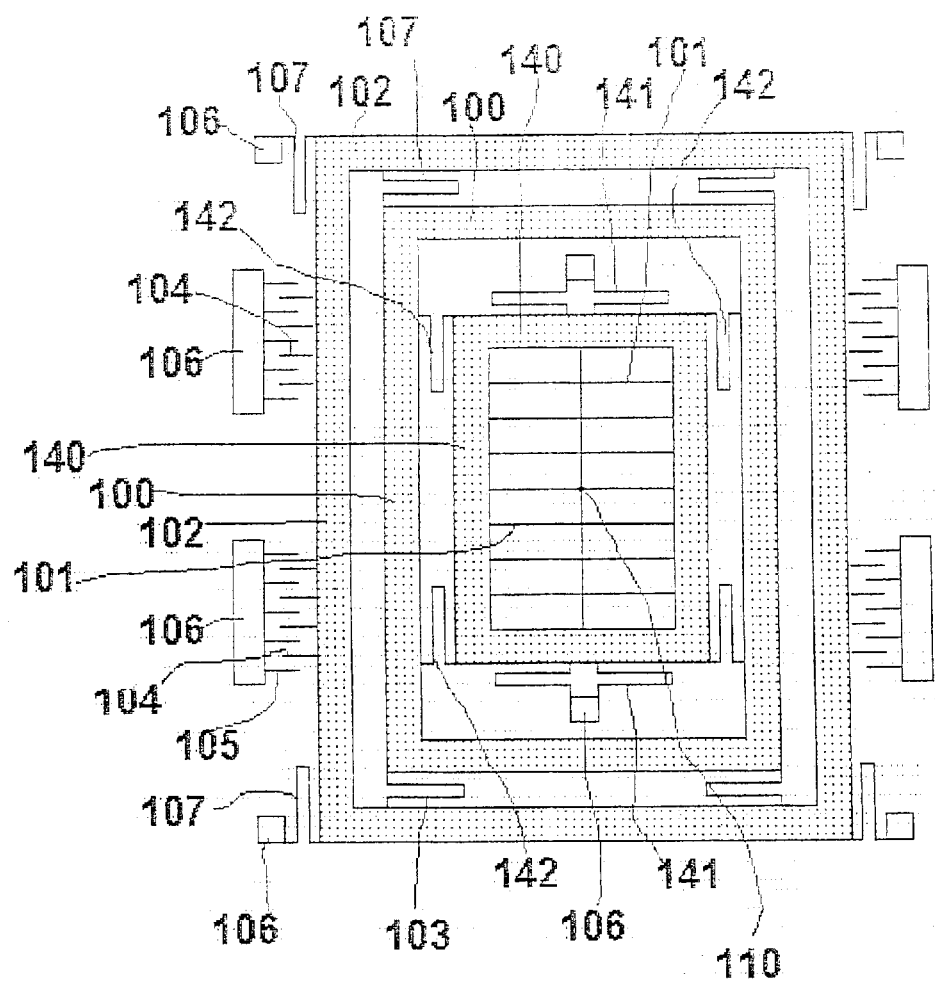
Fig.1
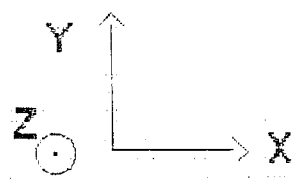

ly a likewise rectangular, frame-shaped drive element 102. The connection between drive element 102 and Coriolis element 100 is provided by spiral springs 103. The spiral springs are configured such that they have a flexible configuration in the Y direction and a rigid configuration in the X direction. Attached to drive element 102 are movable electrodes 104 that reach into stationary electrodes 105 in a comb-like manner. Stationary electrodes 105 are fixedly connected to substrate 1 by bearing blocks 106. Moreover, drive element 102 is connected, via springs 107, to additional bearing blocks 106, which are likewise fixedly connected to substrate 1, Springs 107 are flexible in the X direction and rigid in the Y direction.

ROTATIONAL SPEED SENSOR

FIELD OF THE INVENTION

The present invention is based on an rate-of-rotation sensor.

BACKGROUND INFORMATION

Rate-of-rotation sensors in which a Coriolis element is arranged on the surface of a substrate are referred to in U.S. Pat. No. 6,067,858. The Coriolis element is induced to oscillate in a first axis. The deflections of the Coriolis element due to a Coriolis force in a second axis, which is also parallel to the substrate, are proved.

SUMMARY OF THE INVENTION

An example rate-of-rotation sensor according to the present invention may provide both an excitation element as well as a proof element. Therefore, the proof may occur at a proof element that only moves in the proof direction. The excitation may be performed using an element that only moves in the excitation direction. In such an example system, it may be easy to interpret the frequencies of the oscillations in each of the directions.

The excitation of the oscillations of the Coriolis element may be implemented in a simple manner by a drive element which transmits driving forces via springs. The Coriolis element may be completely suspended at this drive element. Electrostatic comb drives may be provided at the drive element as an excitation arrangement. The proof elements may be suspended on the substrate in a simple manner so that a movement occurs only in the direction of the Coriolis forces. Interference effects due to a movement of the movable electrodes that are not in the proof direction may be suppressed in this manner. An additional Coriolis element may be provided to suppress linear accelerations occurring in the proof direction. In order to then ensure an opposite-phase oscillation of the two Coriolis elements, the opposite-phase oscillation may differ in its frequency from the in-phase oscillation. For this purpose, coupling springs may be provided between drive elements and/or Coriolis elements, or between drive elements and proof elements.

BRIEF DESCRIPTION OF THE DRAWINGS

FIG. 1 shows a top view of a first rate-of-rotation sensor according to the present invention.

DETAILED DESCRIPTION

Figure 3:
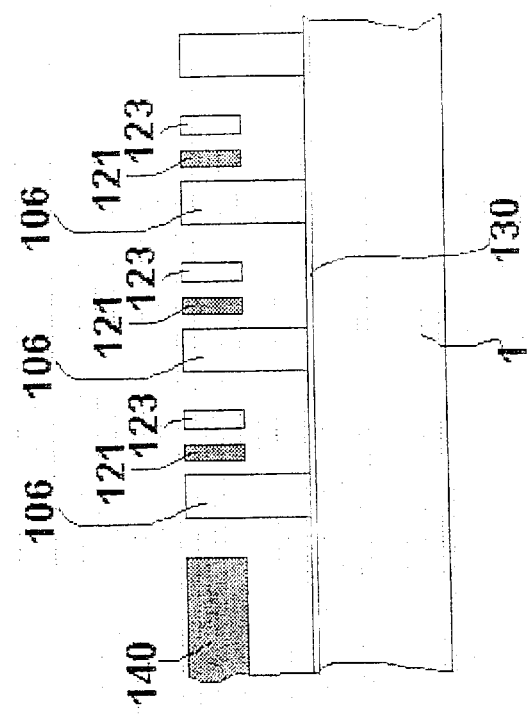
FIG. 3 shows a cross-section through FIG. 2.
Figure 2:
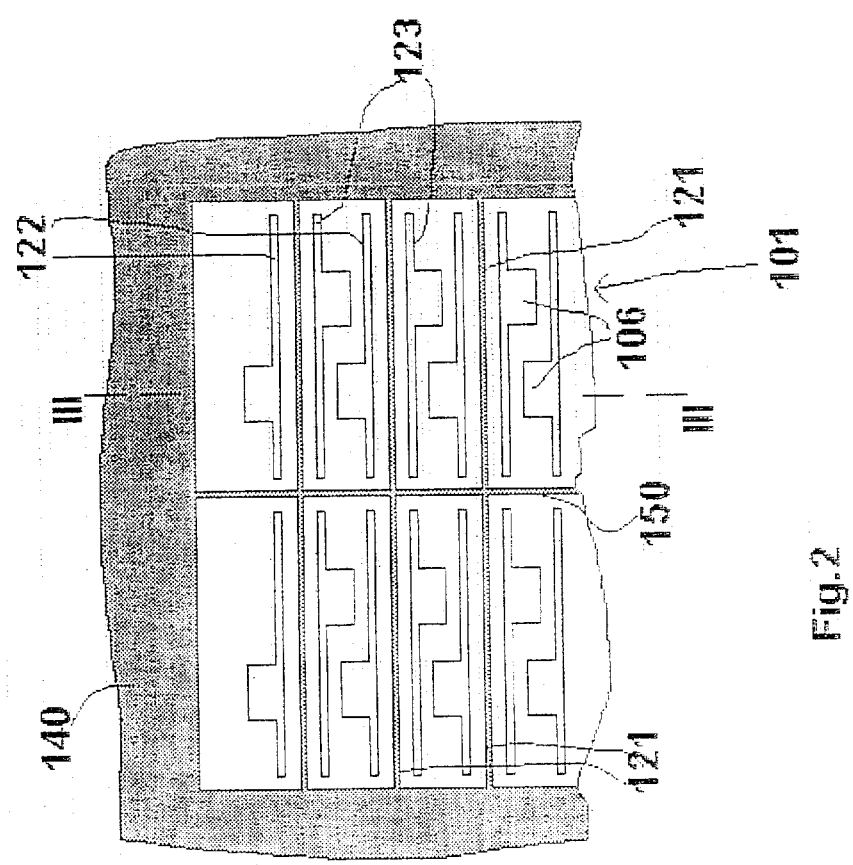
FIG. 2 shows a detailed view of the rate-of-rotation sensor according to FIG. 1.

A first example embodiment of the present invention is explained in FIGS. 1 through 3. FIG. 1 shows a top view of the entire rate-of-rotation sensor; FIG. 2 shows a detailed view of a section of the rate-of-rotation sensor; and FIG. 3 shows a side view of a cross-section through FIG. 2.

FIG. 1 shows a top view of a substrate 1, not shown further in FIG. 1, upon which a Coriolis element 100 is arranged. Coriolis element 100 is configured as a rectangular, frame-shaped structure. Frame-shaped Coriolis element 100 surrounds a proof element 140 which is frame-shaped. Frame-shaped Coriolis element 100 is surrounded To prove an excursion of Coriolis element 100, a frame-shaped proof element 140 is provided in the interior of frame-shaped Coriolis element 100. Proof element 140 is likewise configured as a rectangular frame structure, which is connected to substrate 1 by spring elements 141 having bearing blocks 106. Spring elements 141 are flexible in the Y direction and rigid in the X direction and, therefore, essentially only allow proof frame 140 to be deflected in the Y direction. Spring elements 142 connect proof frame 140 to Coriolis element 100. Spring elements 142 are flexible in the X direction and rigid in the Y direction and, as a result, transmit the Coriolis forces particularly well in the Y direction. Arranged in the interior of proof frame 140 is a grid-shaped evaluation arrangement 101, which is merely sketched in FIG. 1. A detailed view of these elements corresponds to FIGS. 2 and 3.

The rate-of-rotation sensor, therefore, is only connected to substrate 1 by bearing blocks 106. Consequently, both Coriolis element 100 and drive element 102, as well as proof element 140 are movable relative to substrate 1. The movement of these elements is determined only by spring elements 103, 107, 141, 142.

Springs 107 are configured so as to be flexible in the X direction and rigid in the Y direction. Therefore, drive element 102 is essentially only able to move along a path that lies in parallel to the X direction. Coriolis element 100 is connected to drive element 102 via springs 103. Therefore, relative to drive element 102, Coriolis element 100 is essentially only able to move in the Y direction. When drive element 102 moves in a direction in parallel to the X direction. Coriolis element 100 is, of course, also moved in this direction. Relative to substrate 1, Coriolis element 100 is thus movable in a direction in parallel to the X direction and also in the Y direction. Springs 141 connect proof element 140 to substrate 1 in such a manner as to essentially allow a movement relative to the substrate only in a direction parallel to the Y direction. Springs 142 transmit the forces acting on Coriolis element 100 in this direction to proof element 140. Consequently, in response to a movement of Coriolis element 100 in parallel to the Y-direction, proof element 140 is displaced correspondingly.

A gravitational center 110 is additionally indicated for Coriolis element 100 to describe the functioning of the sensor. In each case, the gravitational center is located in the center of frame-shaped Coriolis element 100.

By applying electric voltages between movable electrodes 104 and stationary electrodes 105, drive element 102 is induced to oscillate. Correspondingly, Corciolis element 100 is also induced to oscillate. Gravitational center 110 of Coriolis element 100 then moves along an axis which is parallel to the X axis. Without the action of a Coriolis force (i.e., without a rotational movement of the substrate about an axis that is perpendicular to substrate 1), the gravitational center moves along a straight line. If a rotation of substrate 1 about the Z axis occurs, i.e., about the axis that is perpendicular to substrate 1, a Coriolis force perpendicular to the axis of rotation and perpendicular to the axis of movement acts on Coriolis element 100. These forces then act in the Y direction and cause a displacement of the Coriolis element in the Y direction. Springs 142, which are rigid in the Y directions, transmit the displacement of Coriolis element 100 to proof element 140, the displacement causing a corresponding displacement of proof element 140, which is verified by proof arrangement 101.

Movable electrodes 104, together with stationary electrodes 105 and drive element 102, thus form an excitation arrangement which induces Coriolis element 100 to oscillate, with the oscillation axis of gravitational center 110 being aligned parallel to the substrate.

FIG. 2 shows an enlarged detailed view of evaluation arrangement 101 of proof element 140 in FIG. 1. Frame-shaped Coriolis element 140 surrounds evaluation arrangement 101 which is in the form of grid-shaped electrodes 121, a plurality of grid-shaped electrodes 121 being provided inside the frame-shaped structure of proof element 140. For stabilization purposes, these grid-shaped electrodes 121 are also connected to one another by a center bar 150. Each electrode 121 moves together with proof element 140. Electrodes 121 are disposed between stationary electrodes 122, 123, which are attached on substrate 1 by bearings 106. Electrodes 121, 123 are thus configured as stationary electrodes that do not move relative to substrate 1.

FIG. 3 shows a cross-section along line III—III of FIG. 2. FIG. 3 shows, in cross-section, substrate 1 and a printed circuit trace 130 disposed on the surface of the substrate. Attached to this printed circuit trace, and thus fixedly connected to substrate 1, are anchors 106. Bearings 106 as well as the electrodes attached thereto are electrically conductive and are connected in parallel by printed circuit trace 130. Each movable electrode 121 is disposed between a stationary electrode 122 and a stationary electrode 123. In this manner, two capacitors are formed, between movable electrode 121 and electrodes 122, on the one hand, and between movable electrode 121 and stationary electrode 123, on the other hand. These two capacities are formed as differential capacities, that is, in response to an increase in one capacity, the other capacity decreases correspondingly. Due to the lateral offset of bearing blocks 106 of the two electrode groups 122, 123, the respective capacitors are able to be connected in parallel by appropriate printed circuit traces 130.

In FIG. 3 it may be seen in cross-section that proof element 140 is disposed above substrate 1 and that electrodes 121, which are connected to proof element 140, are also arranged above substrate 1. In the cross-section, the section through bearing blocks 106 of electrodes 122 is shown, which are arranged by bearing blocks 106 on printed-circuit trace 130 and thus are fixedly connected to substrate 1. The cross-section of FIG. 3, electrodes 123 are also shown above the substrate. However, at another point, they are fixedly connected to substrate 1, via a corresponding printed circuit trace 130 for these electrodes.

By measuring the electrical capacitance between the electrodes of evaluation arrangement 101, such as, for example, of movable electrode 121, relative to electrodes 122 and 123, the deflection of proof element 140 relative to the substrate may thus be determined. In this manner it may be possible to determine the Coriolis force that occurs or the rotation rate at which the substrate is rotated.

A material which is conductive by appropriate doping may be chosen for substrate 1 and the elements arranged above the substrate, such as Coriolis element 100, drive element 102, detection element 140, springs and electrodes, silicon. Using insulating layers, the substrate may be electrically insulated in the areas where this is required. However, other materials, such as ceramic, glass or metals, may also be used for the sensors.

Grid-shaped electrodes 121 are movable only in the Y direction, with no transverse movement occurring relative to stationary electrodes 122, 123. A movement in the X direction is not desired for the measurement and may be a possible source of errors. Proof frame 140 and the anchoring to substrate 1 via springs 141 are configured such that flexible electrodes 121 move in the Y direction only.

The rate-of-rotation sensor is a system that is able to oscillate, oscillations occurring in the X direction and Y direction. However, it may not be required to take the same masses and springs into account in each direction; in particular the natural oscillations in the different directions may differ. Since the maximum excursions in response to induced oscillations in the respective directions occur when the frequency of the inducing signal assumes the frequency of the natural oscillation, it may be desirable for a strong measuring signal if the excitation frequency that is applied at electrodes 104, 105 corresponds to the natural oscillation in the Y direction. The natural frequencies in the respective directions result from the masses and the spring constants. To be taken into account for the oscillation in the X direction are the spring constants of springs 107 and 142 in the X direction and the masses of drive element 102 and of Coriolis element 100. For the natural oscillation in the Y direction, the spring constants of springs 103 and 141 in the Y direction and the masses of Coriolis element 100 and proof element 140 need to be taken into account. The spring constants and the masses may be selected such that the frequency of the natural oscillation in the X direction and the Y direction are essentially identical. In this case, large excursions in the Y direction occur even at low rates of rotation, which may be easy to measure.

In series production, however, it may be impossible to avoid process fluctuations, so that an exact tuning of the frequencies in both directions may not be ensured using a purely mechanical arrangement. Here, however, the application of an electric DC voltage at stationary electrodes 122, 123 may be useful. By applying electric DC voltages, it may be possible to generate excursion-dependent forces in the Y direction, which act on movable electrodes 121 and thus on proof element 140. This may cause a reduction in the spring constants of springs 141, so that the frequency for the oscillation in the Y direction is reduced. Therefore, the spring constants and the masses may be selected such that the frequency of the natural oscillation in the Y direction is slightly higher than the frequency of the natural oscillation in the X direction. By selecting an appropriate DC voltage, it may then possible to compensate for the production-related dispersion of the frequencies in the two directions. The DC voltage may be applied either at all electrodes, in addition to a measuring signal, or it is possible to provide additional electrodes for the DC voltages only.

Figure 4:
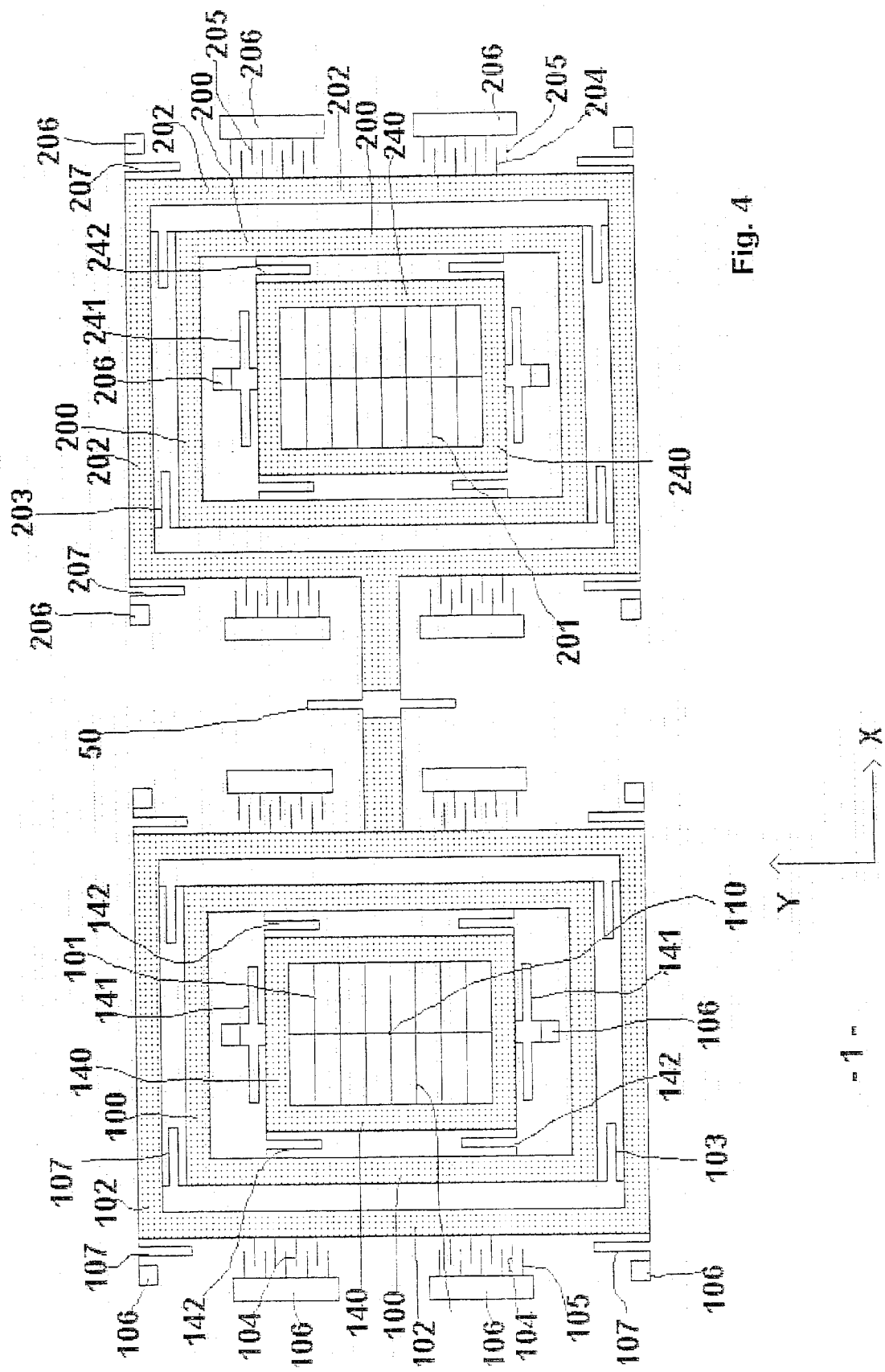
FIG. 4 shows another example embodiment of an rate-of-rotation sensor in a top view.

FIG. 4 shows another example embodiment of the present invention. In contrast to FIG. 1, in addition to Coriolis element 100 as it has already been described in FIG. 1, an additional Coriolis element 200 is provided, which is disposed over substrate 1 next to Coriolis element 100. The additional Coriolis 200 element is also surrounded by a frame-shaped drive element 202 and is connected to it by springs 203. Additional drive element 202 is connected to the substrate by springs 207 having bearing blocks 206. Springs 242 connect additional Coriolis element 200 to an additional proof element 240, which is connected to substrate 1 by springs 241 having bearing blocks 206. The functioning of the additional elements corresponds to the functioning of the elements as they were described in connection with FIG. 1, the correspondingly functioning additional element resulting from adding the number 100 to the reference numbers of FIG. 1.

FIG. 4 thus shows a duplicate example embodiment of the sensor according to FIG. 1. However, a coupling spring 50 is provided in addition which couples the two drive elements 102 and 202 to one another. This coupling spring is taken into account for the oscillation in the X direction when the two drive elements 102 and 202 perform phase-opposed oscillations. During in-phase oscillation, spring 50 is not deformed, so that spring 50 is not taken into account in this oscillation mode. The two oscillation modes thus differ from each other in the respective frequency, so that they are able to be induced in a controlled manner. In this context, an opposite-phase oscillation is to be selectively induced, since it may then be possible to suppress the share of linear accelerations acting on Coriolis elements 100, 200 and proof element 104, 240 in the Y direction, by subtracting the signals. Instead of a coupling spring between drive elements 102, 202, coupling springs may also be provided between the Coriolis element and/or proof elements 140, 240. However, the respective surrounding frames may then be required to be provided with break-through gaps through which the coupling springs are fed.

What is claimed is:

1. An rate-of-rotation sensor comprising:

a substrate;

a Coriolis element arranged over a surface of the substrate;

an excitation arrangement to induce the Coriolis element to oscillate in parallel to a first axis;

a detection arrangement to prove an excursion of the Coriolis element based on a Coriolis force in a second axis that is perpendicular to the first axis, the first and second axis being parallel to the surface of the substrate;

a drive element and a proof element both arranged above the surface of the substrate; and a first spring to connect the drive element to the Coriolis element, the first spring being rigid along the first axis and flexible along the second axis; and a second spring to connect the proof element to the Coriolis element, the second spring being rigid in a first direction and flexible along a second direction.

2. The rate-of-rotation sensor of claim 1, further comprising:

a third spring to connect the drive element to the substrate, the third spring being flexible along the first axis X and rigid along the second axis Y, wherein the excitation arrangement is connected to the drive element.

3. The rate-of-rotation sensor of claim 1, wherein the excitation arrangement includes an electrostatic comb drive.

4. The rate-of-rotation sensor of claim 1, wherein the proof element is provided for the detection arrangement, and the second spring is flexible along the first axis and rigid along the second axis.

5. The rate-of-rotation sensor of claim 4, further comprising:

a plurality of stationary electrodes connected to the substrate, wherein the proof element includes a plurality of movable electrodes that are disposed across from the stationary electrodes.

6. The rate-of-rotation sensor of claim 4, further comprising:

an additional proof element; and a fourth spring to connect the additional proof element to the substrate, the fourth being rigid in the first direction and flexible in the second direction.

7. The rate-of-rotation sensor of claim 1, wherein a mass of the Coriolis element, the proof element, the drive element, and spring constants of the springs are selected in the first direction and in the second direction so that frequencies of natural oscillations of the rate-of-rotation sensor are essentially the same in the first and second directions.

8. The rate-of-rotation sensor of claim 6, wherein at least one of the frequencies of natural oscillations is selected to be slightly higher in the second direction, and the frequencies of the natural oscillations are synchronized in the first and second directions by introducing additional forces in the second direction.

9. The rate-of-rotation sensor of claim 1, further comprising:

an additional Coriolis element; and a coupling spring to connect the Coriolis element to the additional Coriolis element.

* * * * *